United States Patent [19]

Shindo et al.

[11] Patent Number: 4,963,913
[45] Date of Patent: Oct. 16, 1990

[54] AUTOMATIC FOCUSING CAMERA

[75] Inventors: Osamu Shindo, Tokyo; Masahiro Hayakawa, Yokohama, both of Japan

[73] Assignee: Asahi Kogaku Kogyo K.K., Tokyo, Japan

[21] Appl. No.: 362,106

[22] Filed: Jun. 6, 1989

[30] Foreign Application Priority Data

Jun. 17, 1988 [JP] Japan .................................. 63-149475

[51] Int. Cl.$^5$ ............................................. G03B 3/00
[52] U.S. Cl. ...................................... 354/406; 354/477
[58] Field of Search ................................ 354/402–409, 354/477, 152

[56] References Cited

U.S. PATENT DOCUMENTS

| 4,185,191 | 1/1980 | Stauffer . | |
| 4,204,759 | 5/1980 | Yamada et al. | 354/152 |
| 4,357,085 | 11/1982 | Niwa et al. | 354/403 |
| 4,563,576 | 1/1986 | Matsumura et al. | 354/406 |

FOREIGN PATENT DOCUMENTS 54-159259 12/1979 Japan .
63-278012 11/1988 Japan .

OTHER PUBLICATIONS

English Abstract of Japanese Publication No. 63-278012.

*Primary Examiner*—W. B. Perkey
*Attorney, Agent, or Firm*—Sandler, Greenblum & Bernstein

[57] ABSTRACT

An automatic focusing compact camera is provided with a pupil surface processing type focus detecting element. The detecting element has a plurality of units, each including a first light receiving element and a second light receiving element. The detecting element also includes a reimaging lens associated with the light receiving elements.

3 Claims, 2 Drawing Sheets

AUTOMATIC FOCUSING CAMERA

BACKGROUND OF THE INVENTION

The present invention relates to a small camera having a separate photographing optical system and finder optical system. More particularly, this type of small camera utilizes the so-called phase difference detecting method for detecting a focus point, generally employed in a single-lens refrex camera.

The compact camera described above was the first camera provided with an automatic focusing mechanism because the mechanism was relatively uncomplicated. This was so because a photographing lens of the camera is not much different from that of a single-lens reflex camera and the focusing accuracy required for the camera is not so high as that required in the single-lens reflex camera.

Conventionally, compact cameras employ a distance detecting device making use of the principle of triangulation because it does not require a high focusing accuracy and as the camera has a small body the automatic focusing mechanism must be compact.

Today, however, as the function of the compact camera becoming more sophisticated, a more accurate focusing mechanism is required then in the past. The problem is whether a phase difference detecting method is applicable to the compact camera or not, since methods employed by single-lens reflex cameras which requires a higher degree of accuracy.

In general, a detecting element of a focusing device employed in the single-lens reflex camera is an image surface processing type device disposed at a position conjugate with an image surface. When this image surface processing type element is disposed in front of the image surface, a distance between the element and an image is increased, and thus the size of a sensor itself is increased. Accordingly an aberrations must increasingly be corrected; and the light receiving element must be disposed behind a film equivalent surface. With the single-lens reflex camera, this element may be disposed behind the image surface, because this camera has a relatively large body and a light passage can be diverted by a quick return mirror interposed between a photographing lens and a film.

This arrangement, however, cannot be employed in the compact camera because no space is available for the element.

SUMMARY OF THE INVENTION

It is therefore an object of the invention to provide an improved automatic focusing camera capable of detecting the focus point by the phase difference detecting method without increasing the size of the camera body.

For this purpose, according to the invention, there is provided an automatic focusing camera comprising a photographing system including a taking lens system having a focusing lens moveable along an optical axis of the light inputted into the camera and a film to be exposed by the light. The automatic focusing camera further includes a focus point detecting mechanism for detecting a focus point by means of the light inputted through the taking lens system. A first control apparatus for controlling the focus point detecting mechanism so as to be located between the taking lens system and film in the desired period for detecting the focus point is provided and is capable of being retracted from the position at which the focus point has been detected. A second control apparatus is provided for controlling the focusing lens so as to be located at the position corresponding to the focus point detected by the focus point detecting mechanism.

DETAILED DESCRIPTION OF THE DRAWINGS

Figure 1:
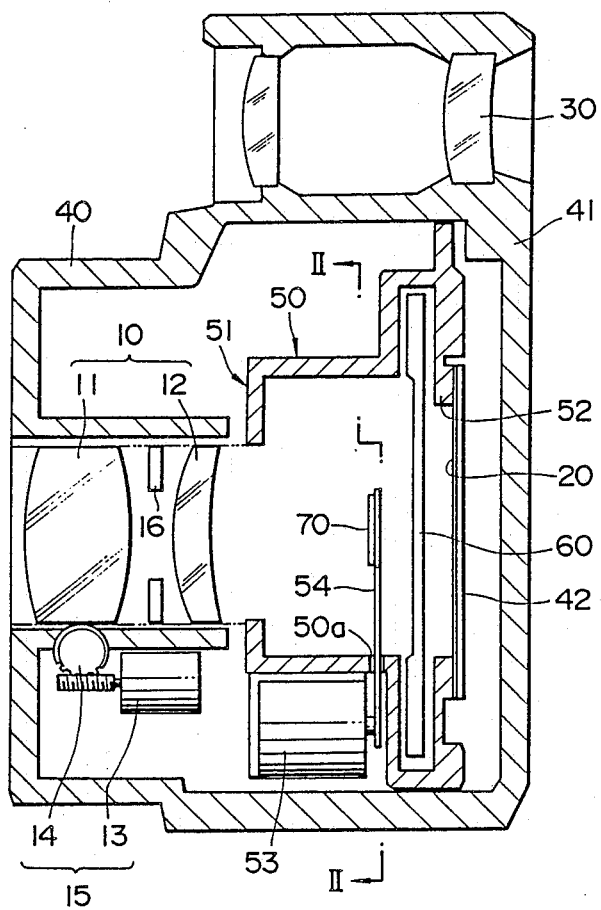
FIG. 1 is a cross sectional view of an embodiment of an automatic focusing camera according to the present invention.
Figure 2:
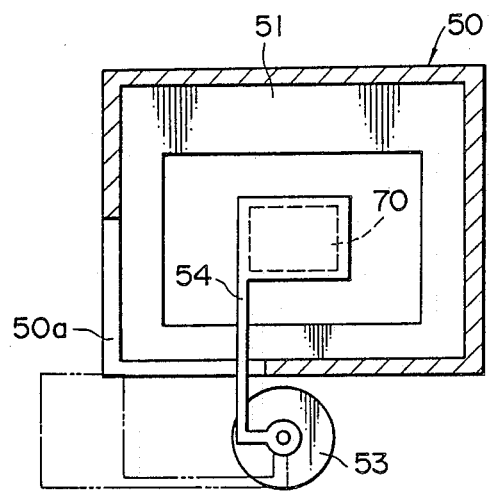
FIG. 2 is a cross sectional view taken along line II—II of FIG. 1.
Figure 3:
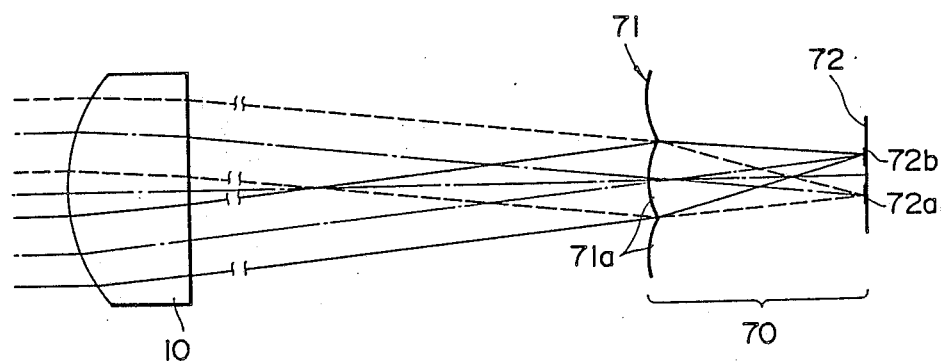
FIG. 3 is a diagram explaining of a principle of a focus detecting element.

The present invention will be described below with reference to the drawings. FIG. 1 through FIG. 3 show an embodiment of an automatic focusing camera according to this invention.

This camera is a compact camera comprising a photographing optical system including a photographing lens 10 and a film 20, and a finder system 30 through which a photographer visually recognizes an object to be photographed. The photographing optical system and the finder system being positioned independently of each other.

The photographing lens 10 composed a front group 11 and rear group 12 is accommodated in lens barrel 40 group 11 can be advanced and retracted in a light axis direction by a lens drive unit 15 composed of a micromotor 13 and a gear mechanism 14.

Diaphragm 16 is interposed between front group 11 and rear group 12.

A light shield hood 50 is fixed in a box-shaped body 41 continuous to the lens barrel 40. Hood 50 has a flange 51 extending inward and defined to the overall circumference of the front edge thereof serving as a lens barrel side. An aperture frame 52 is disposed at the rear edge of the side of hood 50 apart from the lens barrel, the aperture frame 52 restricting a photographing area in the film 20.

A film press plate 42 is disposed on the rear wall of the body 41 to press the film 20 to the aperture frame 52.

A focal-plane shutter 60 is disposed in a photographing light passage from photographing lens 10 to film 20, and a focus detecting element 70 is disposed in front of the shutter such that it advances to and retracts from the photographing light passage. Focus detecting element 70 is attached to a turning shaft of a rotary solenoid 53 as a switching means through an L-shaped supporting rod 54, as shown in FIG. 2.

A spring, which is not shown, is provided with the turning shaft of the rotary solenoid 53 to urge the supporting rod 54, at all times, toward a direction along which the focus detecting element 70 is advanced to the photographing light passage. When energized, the focus detecting element 70 moves to a position, shown by a two-dot-and-dash lines in FIG. 2 against the urging force of the spring and retracts from the photographing passage.

As best seen in FIG. 2, there is a cutout 50a forming part of the hood 50 to enable the focus detecting element 70 to advance and retract.

The focus detecting element 70 used in this embodiment is a pupil surface processing type focus detecting element such as TCL (Through Camera Lens) module disclosed in Japanese Patent Provisional Publication SHO54-159259, and its corresponding U.S. Pat. No. 4,185,191. Focus detecting element 70 disposed in front of a film 20 surface or an expected image surface, as shown by a solid line in FIGS. 1 and 2, when it advances to the photographing light passage. As shown in FIG. 3, this module comprises a fly eye lens 71 including a plurality of fine re-imaging lenses 71a and a light receiving element array 72 disposed behind it, both are provided behind the photographing lens 10. The light receiving array 72 comprises a plurality of first light recieving elements 72a and second light receiving elements 72b. Each set of light receiving arrays is composed of a pair of the first light receiving element 72a and the second light receiving element 72b corresponds to each of the fine re-imaging lenses 71a. The first light receiving element 72a receives a light beam transmitted through the upper side of a diameter of the fly eye lens 71 and the second light receiving element 72b receives a light beam transmitting through the lower side threof.

Outputs from the respective light receiving elements are applied to a detection circuit (not shown) and an amount of defocus of the photographing lens 10 is determined by the comparison of an output pattern of a first light receiving element group with an output pattern of a second light receiving element. The detection circuit calculates a distance necessary to move lens 11 to a focusing position, and a drive current is supplied to the micromotor 13 based on the calculated distance.

In general, the above focus detecting element 70 detects a point where the output from the first light receiving element group disposed on an image surface coincides with the output from the second light receiving element group disposed thereon as the focusing point. In this example, however, since the focus detecting element 70 is disposed in front of the film 20 surface, a focusing position of the focusing lens 10 determined by the output from the element is different from a focusing position of the lens on the film 20 surface. Thus, a focusing signal is obtained in the focus detection circuit taking an offset amount based on a positional difference between the element and the film into consideration in advance.

Next, a sequence of the automatic focusing camera arranged as above will be described.

Usually, the focus detecting element 70 advances to the photographing light passage between the photographing lens 10 and the film 20. Half depression of a shutter button causes diaphragm 16 to open, and thus a distance is measured to determine a lens advancing amount. At the same time, an amount of light is measured by a light measuring means (not shown) to determine a shutter speed, a stop and the like.

Full depression of the shutter button causes the rotary solenoid 53 to be energized, and thus the focus detecting element 70 retracts from the photographing light passage to the outside, the diaphragm 16 is irised to the predetermined value, the lens 11 is advanced, a front-shutter curtain travels, and a trailing shtter curtain thereof travels after a predetermined interval corresponding to the shutter speed.

When the release is finished, the rotary solenoid 53 is deenergized and the focus detecting element 70 is again returned to the photographing light passage by urging force of a spring which is not shown.

The sequence of this embodiment, is described but the present invention is not limited to it and may follow the sequence set forth below.

The above described embodiment employs a focal-plane shutter used in a single lens reflex camera and the like, but a lens shutter usually used in a compact camera may be employed. The lens shutter must be opened when a distance is measured to introduce a focus detecting light beam to the focus detecting element disposed behind the shutter, and a separate light shield screen must be interposed between the focus detecting element and a film to prevent the film from being exposed when the shutter is opened.

Although the light shield screen has an arrangement similar to a focal-plane shutter, it only acts as a light shield member to prevent the film from being exposed when a distance is measured and does not have a function to control and exposing time, and thus it has a simple mechanism and does not require a high accuracy. The arrangement of this embodiment is the same as that of the above embodiment except for the shutter and the light shield screen.

A sequence of a camera arranged as above will be described below.

In the initial condition, both the lens shutter and the light shield screen are closed and the focus detecting element advances to a photographing light passage.

Half depression of a shutter button causes the lens shutter and a diaphragm to open to measure a distance and an amount of light. Full depression of the shutter button causes the shutter to close first, and then the rear light shield screen to completely open and a rotary solenoid to be energized to enable the focus detecting element to retract from the photographing light passage so that the diaphragm is irised out. A lens is advanced, and the lens shutter is released at a speed determined based upon light measuring data.

When the shutter release is finished, the rotary solenoid is deenergized to return the focus detecting element to the photographing light passage, and the light shield screen is closed by the winding up of the film.

As described above, according to the present invention, the use of a pupil processing type focus detecting element enables the provision of a camera having a focusing accuracy superior to that of a conventional compact camera employing a triangulation method without increasing the size of a camera body.

What is claimed is:

1. An automatic focusing camera comprising a photographing system including a taking lens system having a focusing lens moveable along an optical axis of light entering the camera and a film to be exposed by the light, said automatic focusing camera further comprising:

focus point detecting means for detecting a focus point by means of the light entering said taking lens system, said focus point detection means comprises a plurality of units, each including a first light receiving element for receiving light transmitted through one side of the central optical axis of the taking lens system, a second light receiving element for receiving light transmitted through the other side of said axis, and a re-imaging lens corresponding to a pair of said first and second light receiving elements;

first control means for controlling said focus point detection means such that said focus point detection means is located at a position between the taking lens system and film during a desired period for detecting the focus point, and is retracted from the position when the focus point has been detected; and second control means for controlling said focusing lens so as to be located at a position corresponding to the focus point detected by said focus point detection means.

2. The automatic focusing camera according to claim 1 wherein said first control means comprises a spring member for biasing said focus point detection means, and a solenoid coil to be driven against said spring member.

3. An automatic focusing camera comprising a photographing system including a taking lens system having a focusing lens moveable along an optical axis of light entering the camera, and a film to be exposed by the light, said automatic focusing camera further comprising:

means for detecting a condition of the light entering said taking lens system, said detecting means being located at a position between the taking lens system and the film during a desired period for detecting operation, while being retracted from the position when the detecting operation has been executed, said detecting means comprises a plurality of units, each including a first light receiving element for receiving light transmitted through one side of the central optical axis of the taking lens system, a second light receiving element for receiving light transmitted through the other side of said axis, and a re-imaging lens corresponding to a pair of said first and second light receiving elements;

means for shielding the film from the light when the detecting operation is executed; and means for exposing the film by the light entering said taking lens system based upon a result of a detecting operation executed by said means when the detecting means and said shielding means are both located out of the light path of the light.

* * * * *

UNITED STATES PATENT AND TRADEMARK OFFICE
CERTIFICATE OF CORRECTION

PATENT NO. : 4,963,913

DATED : October 16, 1990

INVENTOR(S) : Osamu SHINDO et al.

It is certified that error appears in the above-identified patent and that said Letters Patent is hereby corrected as shown below:

```
    At column 1, line 38, after "Accordingly" insert ---,---.
    At column 2, line 12, after "explaining" delete "of".
    At column 2, line 29, change "composed" to ---has---.
    At column 2, lines 30-31, change "40 group" to ---40.
Front group---.
    At column 3, line 3, after "70" insert ---is---.
    At column 3, line 20, change "transmitting" to ---
transmitted---.
    At column 3, line 66, change ", is described" to ---is
described,---.
    At column 1, line 10, change "refrex" to ---reflex---.
    At column 1, line 25, before "becoming" insert ---is---.
    At column 1, line 26, change "then" to ---than--
    At column 1, line 27, after "whether" insert ---or not---
```

UNITED STATES PATENT AND TRADEMARK OFFICE
CERTIFICATE OF CORRECTION

PATENT NO. : 4,963,913  
DATED : October 16, 1990  
INVENTOR(S) : Osamu Shindo et al Page 2 of 2

It is certified that error appears in the above-identified patent and that said Letters Patent is hereby corrected as shown below:

At column 1, line 28, delete "or not".

At column 1, lines 28-29, change "since methods" to ---this being the method---.

At column 1, lines 29-30, change "requires" to ---require---.

Col. 1, line 38, delete "an".

At column 2, line 30, change "is accommodated" to ---which are contained---.

At column 2, line 59, after "by" delete "a".

At column 3, line 59, change "shtter" to ---shutter---.

At column 4, line 15, after "control", change "and" to ---an---.

Signed and Sealed this

Twenty-second Day of December, 1992

Attest:

DOUGLAS B. COMER

Attesting Officer

Acting Commissioner of Patents and Trademarks